United States Patent [19]

Oyamada et al.

[11] 4,352,975
[45] Oct. 5, 1982

[54] PIPE WELDING APPARATUS

[75] Inventors: Tugio Oyamada; Kenichi Suzuki; Toshikazu Kishi; Eizo Shibato, all of Hitachi, Japan

[73] Assignee: Hitachi, Ltd., Tokyo, Japan

[21] Appl. No.: 218,682

[22] Filed: Dec. 22, 1980

[30] Foreign Application Priority Data

Dec. 26, 1979 [JP] Japan ................................ 54-168283

[51] Int. Cl.³ ............................................. B23K 9/225
[52] U.S. Cl. .............................. 219/125.11; 219/59.1; 219/60 R; 219/136; 414/740
[58] Field of Search ............... 219/125.1, 125.11, 59.1, 219/60 R, 60 A, 72, 136; 414/740

[56] References Cited

U.S. PATENT DOCUMENTS

| | | | |
|---|---|---|---|
| 2,463,907 | 3/1949 | Risley | 219/60 A |
| 2,795,689 | 6/1957 | McNutt | 219/60 A |
| 3,275,795 | 9/1966 | Bosna | 219/125.11 |
| 3,427,428 | 2/1969 | Nelson | 219/125.11 |
| 4,171,175 | 10/1979 | Nobileau | 219/72 |
| 4,196,334 | 4/1980 | Thome | 219/60 A |

*Primary Examiner*—Elliot A. Goldberg
*Attorney, Agent, or Firm*—Antonelli, Terry & Wands

[57] ABSTRACT

A mobile welding apparatus mounted on a manipulator, suitable for use in repair of pipe by welding. The apparatus includes a first clamping mechanism for clamping an already-laid pipe, a second clamping mechanism for clamping a new pipe piece to be welded to the already-laid pipe, a mechanism for moving the second clamping mechanism in the direction of longitudinal axis of the already-laid pipe, a mechanism for moving the second clamping mechanism in the direction parallel to the vertical plane containing the longitudinal axis, a mechanism for moving the second clamping mechanism in the direction perpendicular to the vertical plane containing the longitudinal axis, and a torch rotation mechanism adapted to move along the periphery of the clamped pipe.

7 Claims, 15 Drawing Figures

PIPE WELDING APPARATUS

The present invention relates to an apparatus for welding pipes and, more particularly, to an automatic pipe welding apparatus for renewing a portion of a pipe by cutting and welding, in a piping laid in a restricted space.

It is a common measure to array a plurality of pipes in a regular manner for installing a multiplicity of pipes in the form of a pipe nest or the like.

This piping arrangement offers, from the view point of disposal of pipes, an advantage of efficient use of the limited space. On the other hand, however, this arrangement poses a problem of difficulty in installation, repair and so forth because the work has to be done in a restricted space.

In the event that a defect is formed at a portion of the pipe nest having a multiplicity of pipes arranged at a high density, it is considered to cut and remove the defective pipe, as well as adjacent pipes, to make the defective part accessible by the welding apparatus to repair the piping by successively connecting new pipe pieces by welding.

This repair work, however, requires much time and labour, and is extremely difficult to conduct.

More specifically, this work has the steps of: (a) cutting of the normal or sound pipes, (b) cutting of the defective pipe, (c) transportation of the cut pipe pieces, (d) fabrication and beveling of new pipe pieces in conformity with the lengths and shapes of the cut pipe pieces, (e) beveling of the cut portion of the existing or already-laid pipes, (f) transportation of the newly fabricated pipe piece, (g) positioning of the newly fabricated pipe pieces in relation to the existing pipes and (h) welding of the newly fabricated pipe pieces to the existing pipes. The renewal of the pipes can be conducted by the process stated above, provided that the atmosphere around the piping arrangement permits the worker to have access thereto. However, in the event that the atmosphere does not allow the workers to have access, as in the case of piping arrangement in the nuclear power plant which imposes a serious problem of dosage on the workers, it is almost impossible to apply the above explained process in the repair of the pipes.

It has been proposed, therefore, to use a suitable equipment which can come into the restricted space and controllable remotely, in order to repair the pipes. This method involves, however, a problem concerning the reliability, particularly in connection with the location of the new pipe pieces in relation to the existing pipes, as well as the welding between the newly fabricated pipe pieces and the existing pipes.

It is, therefore, a major object of the invention to provide a pipe welding apparatus which can perform the welding of the pipe pieces to the existing pipes while correctly locating the pipe pieces in relation to the existing pipes.

To this end, according to the invention, there is provided a pipe welding apparatus comprising: a welder including a first clamping means adapted to clamp the existing or already laid pipe, a second clamping means adated to clamp a new pipe piece, means for moving said second clamping means in the axial direction of the already-laid pipe, in the direction parallel to the vertical plane containing the axis of the already-laid pipe and in the horizontal direction perpendicular to the vertical surface, and welding means attached to the first clamping means and adapted to move along the periphery of the pipe clamped by the first clamping means; and a manipulator mounting the welding unit.

DESCRIPTION OF THE PREFERRED EMBODIMENTS

The invention will be fully described hereinunder with reference to the accompanying drawings.

Figure 1:
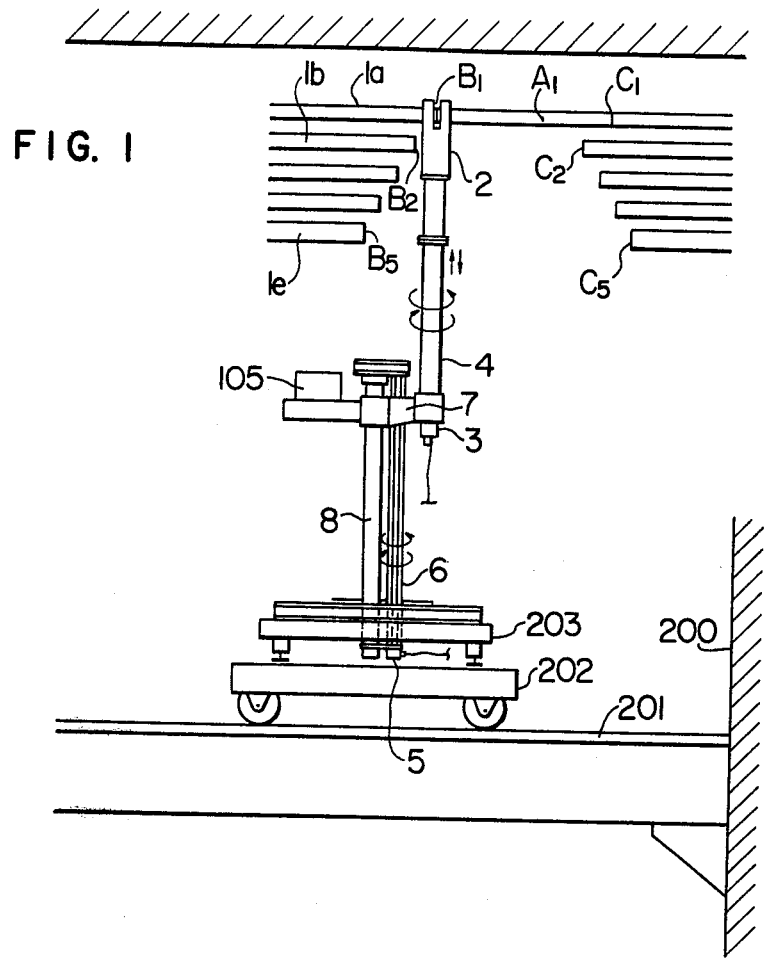
FIGS. 1 and 2 are illustrations of the apparatus of the invention in the state of use.
Figure 2:
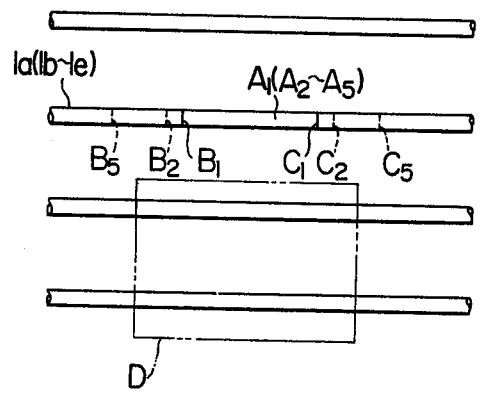

Referring first to FIGS. 1 and 2 illustrating the state of use of an apparatus of the invention, there is shown a welder 2 which is set up for welding a new pipe piece $A_1$ to an already-laid pipe $1a$ at points $B_1$ and $C_1$. Other pipes $1b-1e$ have been cut at points $B_2,C_2-B_5$ and $C_5$.

In repairing the pipe $1a$ by the apparatus of the invention, it is necessary to cut the already-laid pipes $1a$ and $1b-1e$ at points $B_1,C_1$ and $B_2,C_2-B_5,C_5$ and then weld new pipe pieces $A_1$ and $A_2-A_5$ to fill the removed parts of the cut pieces, but it is not necessary to cut a sound pipe portion D.

The welder 2 is mounted on the upper end of a shaft 4 which is adapted to be rotated by a motor 3 and movable up and down. The motor 3 is attached to a supporting portion 7 to which is screwed a ball screw 6 adapted to be rotatively driven by another motor 5, so that the motor 5 is movable up and down along a manipulator 8 as the ball screw 6 is rotated. A relay box 105 of an observation mechanism 15 is mounted on the supporting portion 7. The manipulator 8 is attached to a truck 203 which in turn is mounted on another truck 202 movable in the direction perpendicular to the direction of running of the truck 202. The truck 202 itself is adapted to run along a rail 201 attached to said walls of the building or the like. Thus, the manipulator 8 is movable to anywhere in a horizontal plane by a remote control of the trucks 202 and 203.

Figure 3:
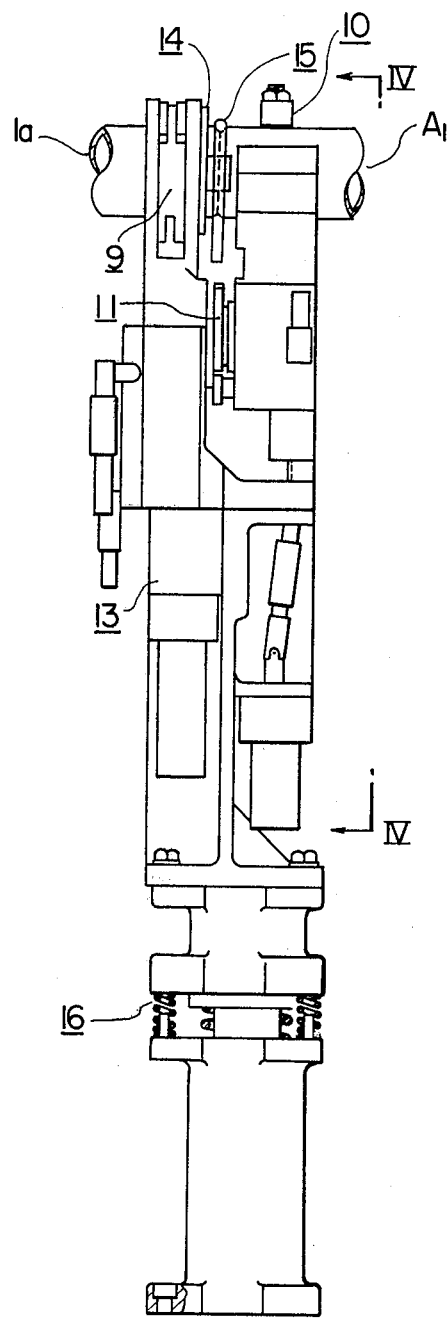
FIG. 3 is a general view of an apparatus of the invention.
Figure 4:
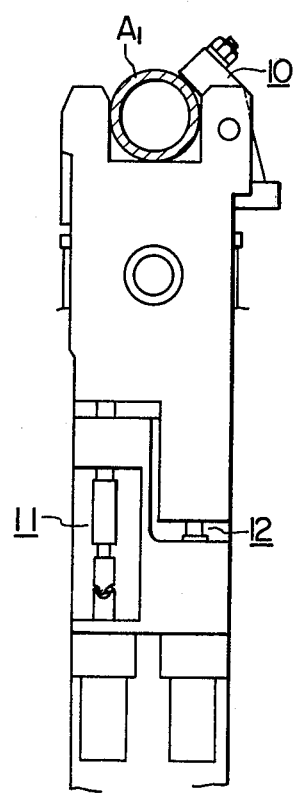
FIG. 4 is a view as viewed in the direction of arrow IV—IV of FIG. 3.

As will be seen from FIGS. 3 and 4, the welder 2 includes a mechanism 9 for clamping already-laid pipe 1a (referred to as first clamping mechanism), a mechanism 10 for clamping new pipe piece $A_1$ which is to be inserted and welded (referred to as second clamping mechanism), a root gap adjusting mechanism 11 adapted to effect an adjustment of the root gap by displacing the new pipe piece $A_1$ in relation to the already-laid pipe 1a in the longitudinal axial direction of the latter, a horizontal locating mechanism 12 adapted to locate the new pipe piece $A_1$ in relation to the already-laid pipe 1a in the horizontal direction perpendicular to the vertical plane containing the longitudinal axis of the already-laid pipe 1a, a vertical locating mechanism 13 adapted for locating the new pipe piece $A_1$ in relation to the already-laid pipe 1a in the direction parallel to the vertical plane containing the longitudinal axis of the already-laid pipe 1a, a torch rotation mechanism 14 mounting two welding torches opposing to each other and capable of rotating the torches around the pipe, a buffer mechanism 16 adapted to provide a buffer to prevent the breakage of the welder when it is interfered during access to the desired portion in the pipe nest, and an observation mechanism 15 including an image fiber scope and a monitoring device adapted for observation of the aforementioned root gap adjusting mechanism 11, horizontal locating mechanism 12 and the vertical locating mechanism 13, as well as the portions therearounds.

Figure 5:
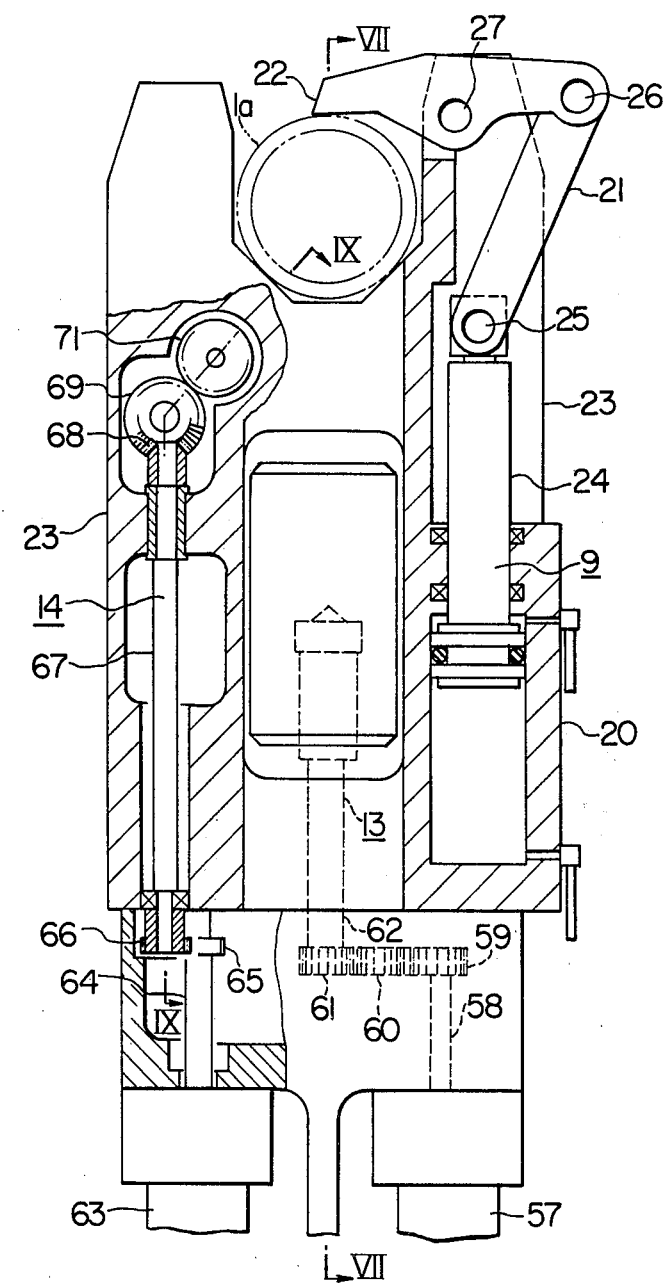
FIG. 5 is a sectional view of a mechanism for clamping already-laid pipe and a torch rotation mechanism.

FIG. 5 shows the detail of the first clamping mechanism 9 for clamping the already-laid pipe. The first clamping mechanism 9 is constituted by a hydraulic cylinder 20, arm 21, clamp metal 22, frame 23, pin 25 interconnecting the arm 21 and the piston 24, and pins 26, 27 interconnecting the arm 21 and the clamp metal 22.

For clamping the already-laid pipe 1a, hydraulic oil is supplied to the lower side of the cylinder 20 to displace the piston 24 upward, so that the arm 21 acts in the same manner as a crank to make the clamp metal 22 to pivot around a fulcrum constituted by a pin 27 to clamp the already-laid pipe 1a. For releasing the already-constructed pipe, the hydraulic oil is fed into the upper side of the piston 24 to displace the latter downwardly.

Figure 6:
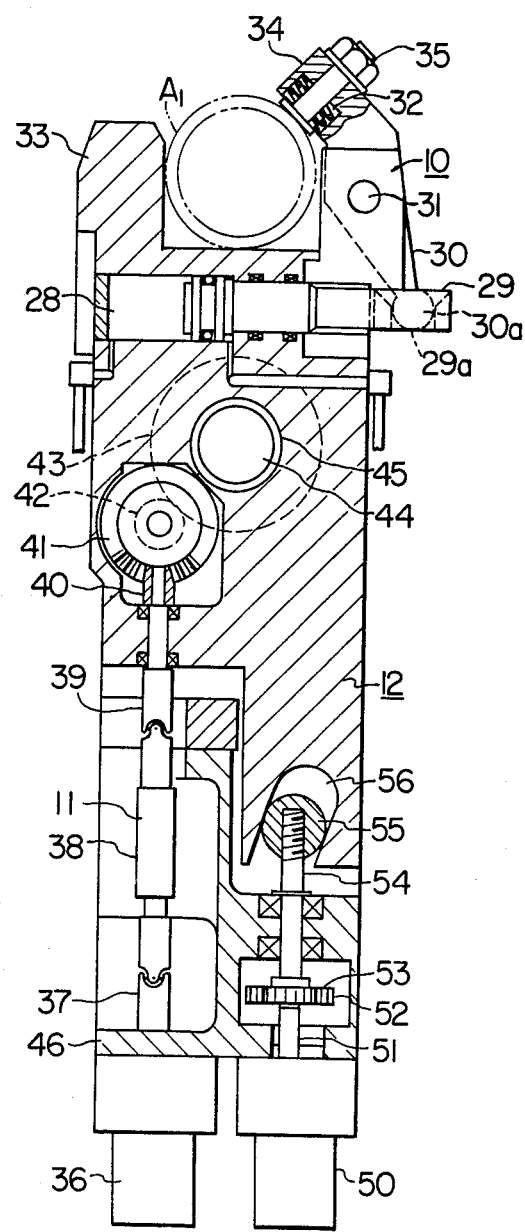
FIG. 6 is a sectional view showing a mechanism for clamping a new pipe piece and a mechanism for locating the new pipe piece in the horizontal direction perpendicular to the vertical plane containing the axis of the already-laid pipe.

FIG. 6 shows the detail of the second clamping mechanism 10 for clamping the new pipe piece. The second clamping mechanism 10 includes a hydraulic cylinder 28, a piston 29, an arm 30 connected to the piston 29, a pin 31 by which the arm 30 is movably supported by a frame 33, and a clamp metal 34 attached to the arm 30 by means of a bolt 35 through the medium of the spring 32. The piston 29 and the arm 30 are connected movably in relation to each other, by means of a spherical portion 30a provided on the arm 30 and a groove 29a having a form embracing the spherical portion 30a and formed in the piston 29. The end of the clamp metal 34 for clamping the new pipe piece $A_1$ has a circular planar shape, and is secured to the arm 30 by the bolt through the medium of the spring 32.

The spring 32 acts as a buffer for protecting the clamping mechanism 10 against any excessive external force.

For clamping the new pipe piece $A_1$, pressurized oil is introduced into the hydraulic cylinder 28 from the left side thereof, so that the piston 29 is displaced to the right. As a result, the arm 30 is moved around the pivot pin 31 in the direction to press the new pipe piece $A_1$ so that the latter is clamped by the clamp metal 34. For unclamping, the pressurized oil is introduced into the cylinder 28 from the right side to cause a leftward movement of the piston 29 thereby to effect the unclamping.

Figure 7:
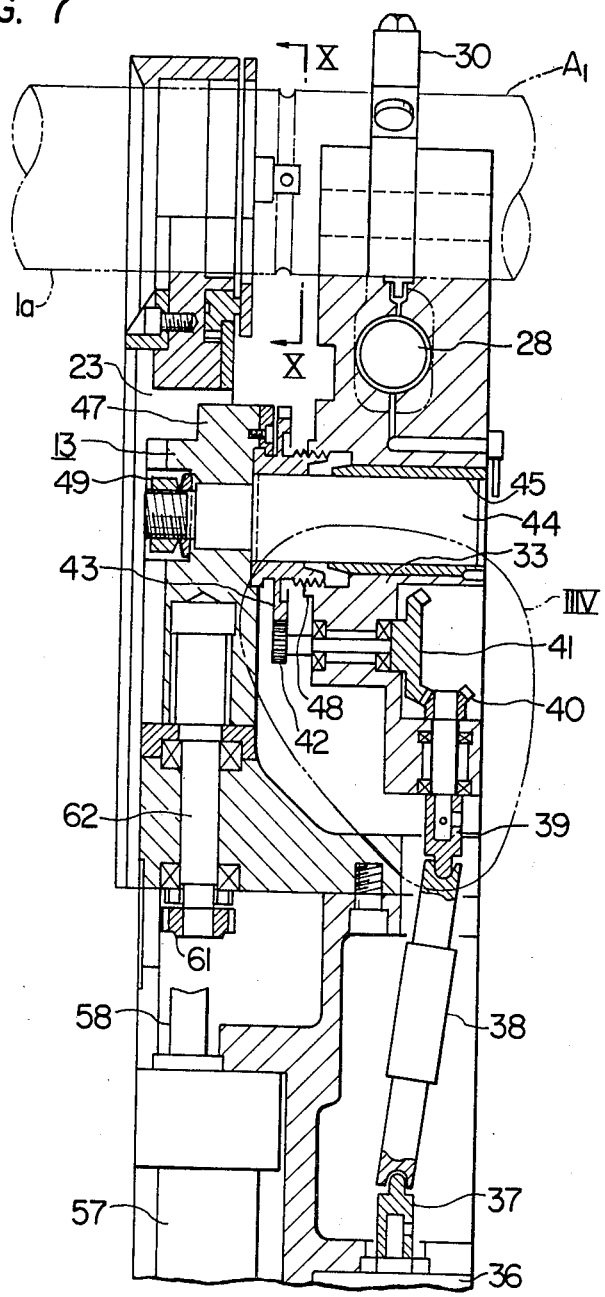
FIG. 7 is a view from the direction of arrow VII—VII of FIG. 5, showing particularly a root gap adjusting mechanism and the above-mentioned mechanism for locating the new pipe piece in the horizontal direction perpendicular to the vertical plane axis of the already-laid pipe.
Figure 8:
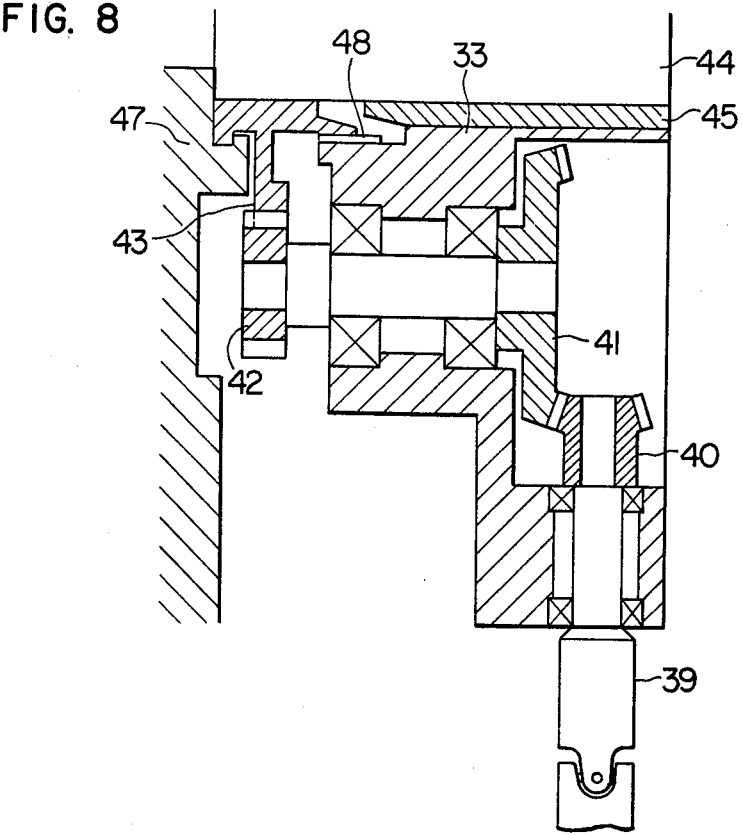
FIG. 8 shows the detail of the portion marked at VIII in FIG. 7.

The detail of the root gap adjusting mechanism 11 will be described hereinunder with specific reference to FIGS. 6, 7 and 8.

The root gap adjusting mechanism 11 is constituted by a motor 36, shaft 37, shafts 38, 39, bevel gears 40, 41, spur gears 42, 43, shaft 44 and a bush 45. The motor 36 fixed to the body 46 of the welder. The shaft 38 is connected at its one end through a universal joint to one end of the shaft 37 which in turn is connected at its other end to the motor 36. The other end of the shaft 38 is connected to the shaft 39 through another universal joint. The bevel gear 40 is connected to the other end of the shaft 39. Although the motor 36 fixed to the welder body 46 is not movable, the frame 33 supporting the shafts 38 and 39 to which the torque of the motor 36 is transmitted is movable horizontally in the direction of longitudinal axis of the shaft 44 by means of the root adjusting mechanism 11. Universal joints are used to permit the transmission of power even when the shafts 37 and 38 are offset from each other as a result of the movement of the frame 33.

The spur gear 42 is fixed unitarily to the bevel gear 41 and meshes with the spur gear 43 which is supported by the body 47 of the vertical locating mechanism which is, as stated before, adapted to locate the new pipe piece in relation to the already-laid pipe in the direction parallel to the vertical plane including the longitudinal axis of the already-laid pipe 1a. The other end of the spur gear 43 is provided with screw thread which is in screw engagement with a threaded portion 48 of the frame 33 of the clamping mechanism 10.

The shaft 44 is connected at its one end to the adjusting mechanism body 47 by means of a nut 49, while the other end is supported by the frame 33 through the bush 45. The operation of the root gap adjusting mechanism 11 is as follows. Namely, the output torque of the motor 36 is transmitted to the bevel gear 41 through the shafts 37, 38 and 39, so that the spur gear 42 integral with the bevel gear 41 is also rotated to rotate the spur gear 43 meshing therewith. The rotation of the spur gear 43 in turn causes, through the bush 45, a sliding movement of the frame 33 along the shaft 44. As the frame 33 moves in the direction of longitudinal axis of the already-laid pipe 1a, the gap of the bevels between the new pipe piece $A_1$ and the already-laid pipe 1a is adjusted.

Hereinafter, a description will be made as to the horizontal locating mechanism 12 for locating the new pipe piece in relation to the already-laid pipe 1a in the direction perpendicular to the vertical plane containing the longitudinal axis of the already-laid pipe, with specific reference to FIG. 6. The horizontal locating mechanism 12 includes a motor 50, shaft 51, spur gears 52, 53, shaft 54, roller 55 and a U-shaped groove 56. The motor 50 is fixed to the body 46 of the welder and the shaft 52 is coupled thereto. The spur gear 52 fixed to the end of the shaft 51 meshes with the spur gear 53 to which connected is the shaft 54 provided at its one end with a thread screwed into female thread of the roller 55. The horizontally disposed columnar roller 55 is mounted in the U-shaped groove 56 having a rectangular longitudinal section and a U-shaped cross-section, formed in the frame 33 of the clamp mechanism 10. As will be seen from FIG. 6, the U-shaped groove 56 is formed at a predetermined angle to the shaft 54.

The horizontal locating mechanism 12 is driven by the motor 50 the output torque of which is transmitted to the shaft 54 through the spur gears 52 and 53. As the shaft 54 is rotated, the roller 55 fixed by means of a screw is moved upward so that the U-shaped groove 56 is moved upward by the force of the roller 55. In consequence, the new pipe piece $A_1$ clamped around the pivot constituted by the shaft 44 is moved toward the arm 30 along an arcuate path. As the roller 55 moves up and down in the U-shaped groove 56, the new pipe piece $A_1$ is moved around the fulcrum constituted by the shaft 44.

The new pipe piece $A_1$ moves along an arcuate path. However, since the necessitated amount of adjustment in horizontal location of the new pipe piece is not so large, the angular displacement around the pivot point constituted by the shaft 44 is quite small. Thus the movement of the new pipe piece $A_1$ can be regarded as being materially linear.

The detail of the vertical locating mechanism 13 for locating the new pipe piece in relation to the already-laid pipe in the direction parallel to the vertical plane containing the longitudinal axis of the already-laid pipe will be described with specific reference to FIGS. 5 and 7.

The vertical locating mechanism 13 includes a motor 57, shaft 58, spur gears 59, 60 and 61, and a shaft 62. The motor 57 is fixed to the welder body 46, and a shaft 58 is directly connected thereto. The spur gear 59 fixed to the end of the shaft 58 meshes with spur gears 60 and 61. The shaft 62 connected at its one end to the spur gear 61 is provided at its other end with a thread which is screwed into the female thread formed in the adjusting mechanism body 57.

In operation of the vertical locating mechanism 13, the spur gear 59 is driven by the motor 57 to drive the spur gears 60 and 61. The shaft 62 is rotated as a result of the rotation of the spur gear 61, so that the adjusting mechanism body 47 coupled by the screw is moved in the direction parallel to the vertical plane containing the longitudinal axis of the already-laid pipe 1a while being guided by the frame 23.

Since the second clamping mechanism 10 is mounted on the mechanism body 47 through the medium of the axis 44, the movement of the adjusting mechanism body 47 parallel to the vertical plane causes a translational movement of the clamping mechanism 10, thereby to effect the correction of dislocation between the bevels of the already-laid pipe 1a clamped by the first clamping mechanism 9 and the bevels of the new pipe piece $A_1$ in the direction parallel to the vertical plane.

Figure 9:
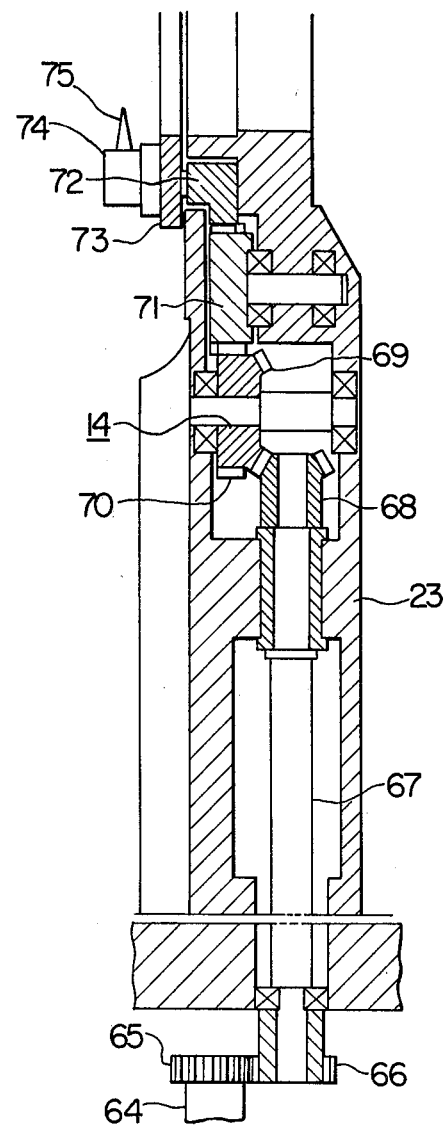
FIG. 9 is a view as viewed from the direction of IX—IX of FIG. 5.

The detail of the torch rotation mechanism 14 will be described hereinunder with specific reference to FIGS. 5, 9 and 10. The torch rotation mechanism 14 includes a motor 63, shaft 64, spur gears 65 and 66, shaft 67, bevel gears 68 and 69, spur gears 70 and 71, C-shaped gear 72, torch mounting plate 73 and torch holders 74. The motor 63 is connected to the shaft 64 and fixed to the body 46 of the welder. The spur gear 65 fixed to the end of the shaft 64 meshes with the spur gear 66 fixed to the shaft 67. The shaft 67 is provided at its other end with the bevel gear 68 fixed thereto and meshing with the bevel gear 69 to which unitarily fixed is the spur gear 70. The spur gear 70 engages with the spur gear 71 which in turn meshes with the C-shaped gear 72. The torch mounting plate 73 attached to the C-shaped gear 72 carries two torch holders 74, 74 at angular positions of 90° and 270°, i.e. at a 180° interval.

Figure 10:
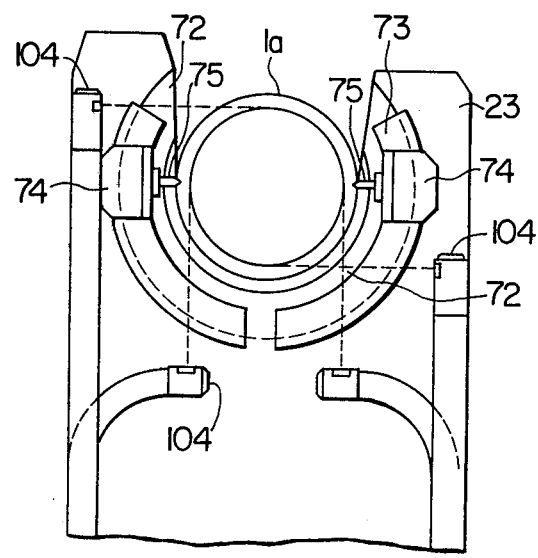
FIG. 10 is a view as viewed from the direction of X—X of FIG. 7.

The torch rotation mechanism 14 operates, after locating the new pipe piece $A_1$ in relation to the already-laid pipe 1a such that the bevels between the opposing ends of the new pipe piece $A_1$ and the already-laid pipe 1a fall within the predetermined range by the cooperation of the vertical locating mechanism 13, horizontal locating mechanism 12 and the root gap adjusting mechanism 11, to temporarily weld at angular positions of 90° and 270° as shown in FIG. 10 by the torches 75, 75. Then, the torch mounting plate 73 is rotated by 180° to effect the temporary or tack welding at angular positions of 180° and 360°. After making the tack welding at four points equi-spaced in the circumferential direction, the entire circumference is welded by means of the torches 75, 75.

The torch rotation mechanism 14 transmits the torque of the motor 63 to the spur gear 65 through the shaft 64 thereby to drive the spur gear 66 meshing with the gear 65, so that the bevel gear 68 fixed to the shaft 67 and, hence, the bevel gear 69 are rotated.

In consequence, the spur gear 70 integral with the bevel gear 69 and, accordingly, the spur gear 71 meshing with the spur gear 70 are rotated to rotatively drive the C-shaped gear 72. As a result, the torch mounting plate 73 attached to the C-shaped gear 72 is rotated to cause the rotation of the torch holders 74, 74. The torches (electrodes) 75, 75 then effect the tack welding at angular positions of 90°, 270°, 180° and 360° and then the torches 75, 75 are rotated in the counter-clockwise direction to complete the welding over the entire circumference.

In the event that the welding has to be made by a wire-feed type welder, the welding over the entire circumference is effected by an automatic welder mounted on another manipulator, after effecting the temporary welding at four points by the torch rotation mechanism 14.

Figure 11:
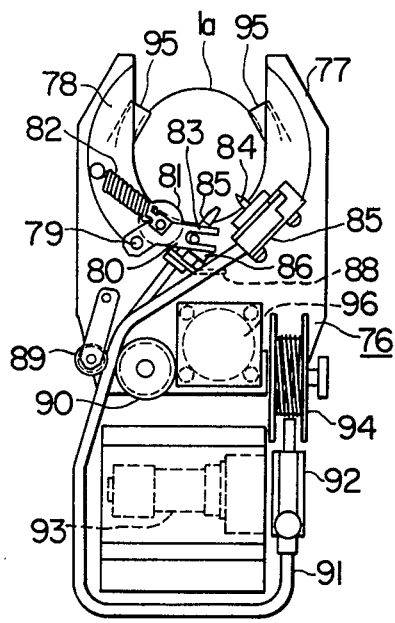
FIG. 11 is a schematic front elevational view of an automatic welder.

FIG. 11 shows an example of the automatic welder. The automatic welder 76 has a welding head 77 provided with a U-shaped notch, rotary plate 78, bifurcated arm 80 rotatably secured to the rotary plate 78 by means of the pin 79, a profile roller 81 adapted to roll along the periphery of the already-laid pipe 1a and rotatably carried by the bifurcated arm 80, a spring 82 attached to the rotary plate 78 and adapted to press the profile roller 81, a torch 84 attached to a torch adjuster 83 operatively connected to the profile roller 81 and adapted to blow argon gas to the weld portion and wire feeding member 85, an adjuster 86 for adjusting the wire feeding member 85, a wire feeding cable 87, a power cable 88, cable feed rollers 89 and 90, a wire feed cable 91, a wire feed device 92, a motor 93, a wire spool 94, and a pneumatic cylinder 96 for actuating clamps 95, 96. The rotary plate 78 can rotate clockwise and counter-clockwise by means of meshing warm gears (not shown).

The automatic welder 76 operates in a manner explained hereinunder. After moving the automatic welder 76 mounted on the manipulator (not shown) to the desired place, the already-laid pipe 1a is clamped by the clamps 95, 96 through the action of the pneumatic cylinder 96. Then, the motor 93 actuates the wire feeding device 92 and power is supplied to the torch 84 through the power cable 88. Then, the wire is fed by means of the wire cable 91 to start the welding, so that the warm (not shown) is rotated to cause a rotation of the profile roller 81 roll along the periphery of the already-laid pipe 1a. Consequently, the wire feed portion 85 operatively connected to the profile roller 81 feeds the wire which is molten by the arc generated by the torch 84 which is also operatively connected to the profile roller 81 under the presence of the argon gas blown to the welding portion, thereby to completely weld the junction between the already-laid pipe 1a and the new pipe piece $A_1$ over the entire circumference thereof.

Figure 12:
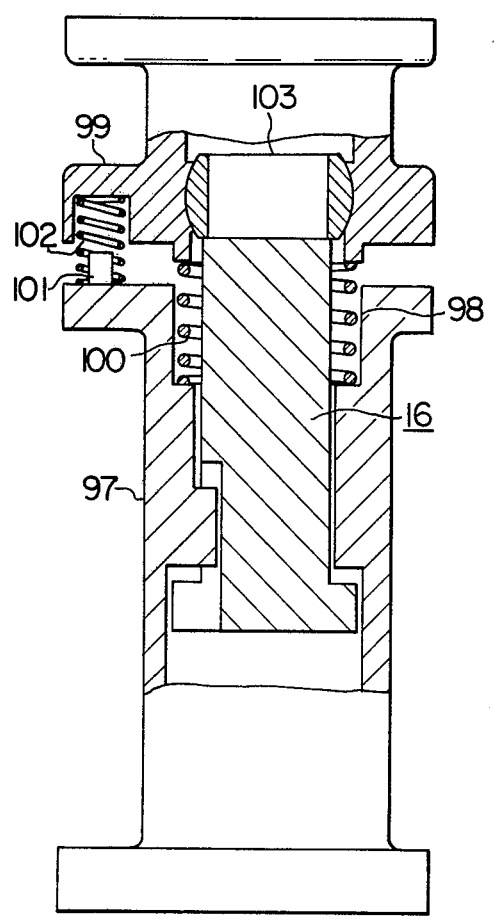
FIG. 12 is a sectional view of a buffer mechanism.

Hereinafter, an explanation will be made as to the buffer mechanism 16 with specific reference to FIG. 12. The buffer mechanism 16 includes a frame 97 mounted on and supported by the manipulator 8, a spring 100 disposed in a groove 98 of the frame 97 and pressurized at a constant force by a frame 99, springs 102 secured to four pins 101 on the frame 97 and loaded at a constant force by the frame 99 and a spherical bearing 103 secured to the frame 99.

Assuming here that a vertical external force is applied to the welder 2 when the latter is moved into the pipe nest, by an interference with the environmental structure, the impact is absorbed by the spring 100 which is compressed in response to the vertical external force, so that the welder is protected against breakage. Also, when the external force is applied in the lateral direction, the welder is tilted in the direction opposite to the direction of application of the force while compressing the springs 102 at the opposite side of the application of force, i.e. at the side to which the welder declines, so that the welder is protected from the breakage. Needless to say, the welder resumes the original position as it is released from the external force.

The detail of the observation mechanism 15 will be explained hereinunder with specific reference to FIGS. 10, 13 and 14. For making the adjustment of the bevels, as well as the welding operation, by a remote control, it is necessary to use the observation mechanism 15 which observes the work in place of the operator. For a simple observation purpose, it is possible to use an ordinary TV camera as the observation mechanism. However, when the space to be observed is restricted as in the case of observation of bevel alignment of small-diameter pipes, it is not possible to use ordinary TV camera due to the restriction of space. It is advisable, in such a case, to use an image fiber scope 104 having a sufficient flexibility and small size.

Thus, the observation mechanism 15 of the invention includes an image fiber scope 104 for observing the state of welding, as well as adjustment of bevels, a relay box 105 and a monitor device 106. The relay box 105 includes a filter 107, light source 108, TV camera 109 and a power source 110 for the camera 109. The monitor device 106 is constituted by a monitor TV 111, camera control unit 112 and a line generator 113.

The image fiber scope 104 shown in FIG. 10 is fixedly mounted on the frame 33 so as to be able to observe the four welding points, i.e. the points of angular positions of 90°, 180°, 270° and 360° on the circumference of the bevel.

The relay box 105 is attached to the manipulator 8, while the monitor device 106 is located at an observation station which is remote from the welder 2. It is possible to observe the welding condition of the entire circumference by attaching a plurality of image fiber scopes 104 through the welding head 77 of the welder 76 shown in FIG. 11. In this case, the relay box 105 is attached to the manipulator mounting the automatic welder 76.

Figure 13:
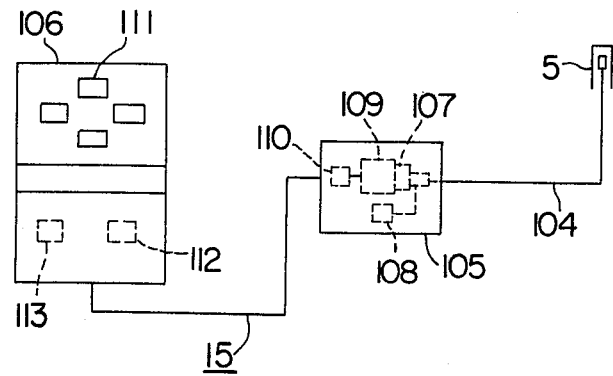
FIG. 13 is a system diagram of an observation mechanism.
Figure 14:
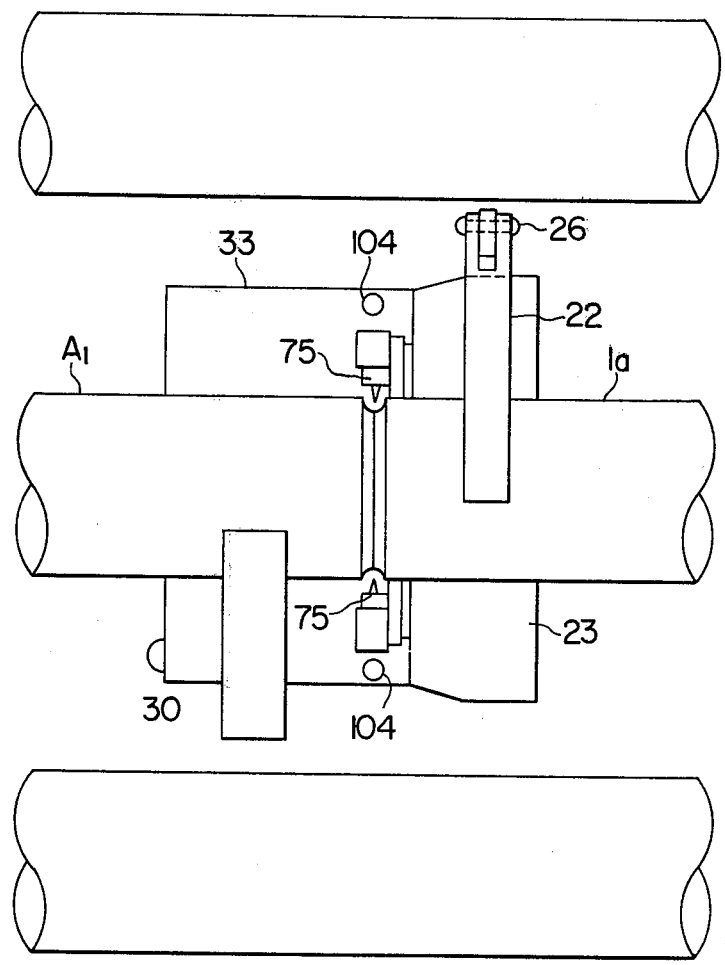
FIG. 14 is a plan view showing the state of coupling between the apparatus of the invention and pipes.

The observation is made in the manner explained hereinunder with reference to FIGS. 13 and 14. When the weld portion before the welding is not bright-sufficiently, light is emitted from the light source to illuminate the weld portion. Therefore, the image of the portion to be observed, i.e. the four points where the welding is to be made, is transmitted through the image fiber scope 104, filter 107, TV camera 109 and the camera control unit 112, and is displayed on the monitor TV of the monitoring device 106 at a larger scale. In this state, the root gap, the horizontal dislocation and the vertical dislocation are measured by the line generator 113, and a judgement is made whether the root gap and the dislocations are within allowable ranges. If these conditions are met, the welding is commenced. The gap $l_1$ and the dislocation $l_2$ are suitably determined beforehand in accordance with the pipe diameter.

Since an arc is generated during the tack welding and welding over entire circumference, the observation of state of generation of the arc necessitates a replacement or change of the filter 107.

The location of the new pipe piece $A_1$ in relation to the already-laid pipe 1a, as well as the welding therebetween, is performed in a manner explained hereinbelow.

The welder 2 is moved up and down as the ball screw 6 is rotated by the motor 5. The motor 3 is actuated as necessitated to drive the shaft 4 vertically and to rotate the same back and forth. Then, while making a remote control of the manipulator 8, the welder 2 is inserted into the restricted space in the pipe nest, with the new pipe piece $A_1$ clamped by the second clamping mechanism 10. As the welder 2 reaches the predetermined position, the already-laid pipe is clamped by the first clamping mechanism. The clamped state is shown in plan in FIG. 14.

Then, while observing the bevel by means of the observation mechanism 15, the second clamping mechanism 10 clamping the new pipe piece $A_1$ is moved in the vertical direction parallel to the vertical plane containing the longitudinal axis of the already-laid pipe 1a and also in the horizontal direction perpendicular to the vertical plane, thereby to effect an adjustment to make the root gap and the dislocation fall within the allowable limits $l_1$ and $l_2$. If the allowable limits of the root gap and the vertical and horizontal dislocation ae exceeded, it is necessary to reset the welder 2 to the original state and to machine again the bevel of the new pipe piece $A_1$ in accordance with the value actually measured by the monitor device 106, and the welder 2 is set again at the welding position in the pipe nest.

If the actually measured values of the root gap and the dislocations fall within the predetermined limit values, the filter 107 in the relay box 105 is changed to a welding filter by a remote control, in order to observe the state of tack welding. Then, the welding at angular positions of 90° and 270° are made while observing the state of welding by the observation mechanism 15, and thereafter, the torch rotation mechanism 14 is rotated by 90° to bring the torches 75, 75 to the welding points of angular positions of 180° and 360° to effect the welding at these points while making the observation in the same manner, thereby to complete the correct locating temporary welding at these four points. Thereafter, the welding is conducted over the entire circumference and the torches 75 are brought back to the positions of 90° and 270°.

Subsequently, the new pipe piece $A_1$ and the already-laid pipe $1a$ are unclamped and the manipulator 8 is lowered.

In case that the welding by wire feed system is necessary, the torches 75 and 75 are brought back to the angular positions of 90° and 270°, respectively, after the completion of tack welding at four points, and, subsequent to the unclamping of the new pipe piece $A_1$ and the already-laid pipe $1a$, the manipulator is lowered and the automatic welder 76 mounted on the other manipulator is controlled remotely while clamping the already-laid pipe $1a$ by means of the clamps 95, 95. Thereafter, the wire is fed and the power is supplied to the torch 84 to start the welding, while rotating the rotary plate 78. In the observation mechanism 15 having a plurality of image scope fibers 104 fixed to the welder head 77, the filter 107 of the relay box 105 is changed to a filter for observation of welding to permit the observation of state of welding during the welding over the entire circumference. After the completion of the welding, clamps 95 and 95 are made to release the new pipe piece and the manipulator is lowered to complete the welding.

Figure 15:
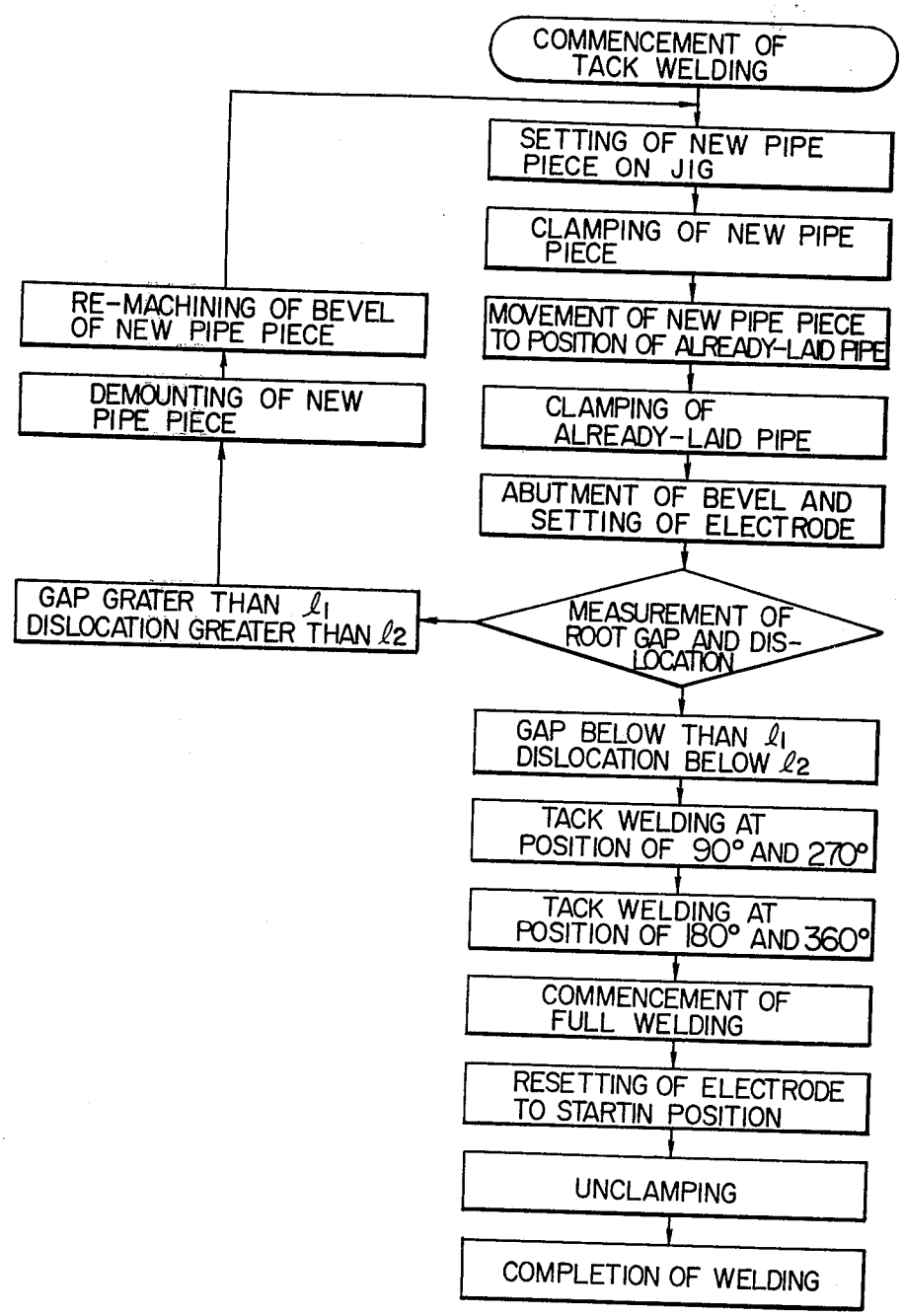
FIG. 15 is a flow chart of the work conducted by the apparatus of the invention.

The above-described process will be more fully understood when the foregoing description is read in conjunction with the flow chart shown in FIG. 15.

In the described embodiment of the invention, the tack welding of the pipe piece $A_1$ to the already-laid pipe $1a$ $l$ is made only at four points of each end of the new pipe piece $A_1$, because, if the welding is made completely at one end thereof, the dislocation at the opposite side of the new pipe piece $A_1$ is impractically increased to deteriorate the quality of welding. Therefore, according to the invention, the welding over the entire circumference is conducted only after the tack welding at each end of the new pipe piece at four points.

Also, in the foregoing description, only the clamp mechanisms are locating mechanisms for only one end of the new pipe piece are shown. It is, however, possible to provide the clamp mechanisms and the locating mechanisms for each end of the new pipe piece $A_1$. By so doing, it is possible to conduct the setting of the pipe piece, as well as welding, at both sides of the pipe piece simultaneously. Such a simultaneous welding effectively eliminates the adverse influence of the welding on both ends of the pipe piece.

As will be understood from the foregoing description, according to the invention, the dislocation between the already-laid pipe and the new pipe piece is adjusted easily and remotely so that the new pipe can be located correctly in relation to the already-laid pipe to ensure a high reliability of the weld joint. In addition, since the welding can be made in such a manner that at first the welding is made temporarily and locally as a tack welding and then fully over the entire circumference, the reliability of the welding is further improved advantageously.

What is claimed is:

1. A pipe welding apparatus comprising: a welding unit including a first clamping means adapted to clamp an already-laid pipe, a second clamping means adapted to clamp a new pipe piece which is to be welded between sections of said already-laid pipe, a moving means for moving said second clamping means in the direction of longitudinal axis of said already-laid pipe, in a direction parallel to a vertical plane containing said longitudinal axis and a horizontal direction perpendicular to said vertical plane, and welding means attached to said first clamping means and adapted to move along the periphery of said already-laid pipe clamped by said first clamping means; and a manipulator mounting said welding unit.

2. A pipe welding apparatus as claimed in claim 1, wherein said moving means includes a first moving means adapted to move said second clamping means in the direction of longitudinal axis of said already-laid pipe; second moving means adapted to move said second clamping means in the direction parallel to said vertical plane containing said longitudinal axis of said already-laid pipe and third moving means adapted to move said second clamping means in the direction perpendicular to said vertical plane.

3. A pipe welding apparatus as claimed in claim 1, wherein said first clamping means includes a frame member supporting said first clamping means, a piston-cylinder assembly mounted on said frame member, an arm member connected to said piston member and a clamping member connected to said arm member and secured rotatably to said frame member, while said second clamping means includes a frame member adapted for clamping said second clamping means, a piston-cylinder assembly mounted on said frame member, and an arm member connected to said piston member and rotatably secured to said frame member.

4. A pipe welding apparatus as claimed in claim 1, wherein said welding means is attached to a frame member supporting said first clamping means and is adapted to be driven by a driving means mounted on said frame member.

5. A pipe welding apparatus as claimed in claim 1, further comprising a buffer mechanism disposed between said welding unit and said manipulator.

6. A pipe welding apparatus as claimed in claim 1, wherein said welding unit further includes an observation means incorporating an image fiber scope and adapted to permit the operator to observe the state of location of said new pipe piece in relation to said already-laid pipe, as well as the state of welding therebetween.

7. A pipe welding apparatus as claimed in claim 1, wherein said moving means moves said second clamping means after said second clamping means clamps said new pipe piece in order to align said new pipe piece with said already-laid pipe.

* * * * *